United States Patent [19]

Roiser

[11] 3,749,321

[45] July 31, 1973

[54] FERTILIZER SPREADING MECHANISM

[76] Inventor: Josef Roiser, Haus No. 1, D-8949 Saulengrain, Germany

[22] Filed: Apr. 28, 1972

[21] Appl. No.: 248,544

[30] Foreign Application Priority Data

May 6, 1971 Germany.................. P 21 22 344.9
May 11, 1971 Germany.................. P 21 23 190.3

[52] U.S. Cl.............................. 239/669, 239/683
[51] Int. Cl....................... A01c 17/00, A01c 19/00
[58] Field of Search................... 239/659, 667, 673, 239/683, 669, 679

[56] References Cited
UNITED STATES PATENTS 3,183,006  5/1965  Herder............................... 239/669

Primary Examiner—Lloyd L. King
Attorney—Allison C. Collard

[57] ABSTRACT

A fertilizer spreading mechanism in the rear portion of a vehicle body. A scraper belt on the floor of the vehicle conveys fertilizer in incremental steps towards a pair of helical rollers which are rotatably mounted on vertically disposed axes. The rollers spread the fertilizer conveyed to the rear of the vehicle by the scraper belt. The helical rollers are provided with a plurality of teeth on the edges thereof which disengage the fertilizer from the mass in the vehicle. The mechanism spreads the fertilizer alternately towards and away from each of the rollers by means of oscillating members located between and/or on both sides of the spreading rollers.

9 Claims, 5 Drawing Figures

FERTILIZER SPREADING MECHANISM

The present invention relates to a material-spreading mechanism, and in particular to a fertilizer spreading mechanism for a vehicle having a scraper belt disposed in the bottom of the body of the vehicle for conveying the fertilizer towards the rear portion of the vehicle.

Conventional fertilizer spreading mechanisms utilize spreading rollers which are mounted and rotatable about vertical axes to spread the fertilizer. These mechanisims usually spread the fertilizer over a considerable area, whose width is generally several times greater than the width of the vehicle on which the fertilizer spreading mechanism is mounted. However, the spreading of the fertilizer over such great areas requires the ejection of very large quantities of fertilizer from the vehicle, and the rate of spreading often exceeds the limit of the power take-off mechanism on the towing vehicle.

To overcome the above-described disadvantages, attempts have been made to reduce the output of the fertilizer spreaders by utilizing spreading rollers which extend only partially across the width of the vehicle. In such mechanisms, feed rollers are disposed between the vehicle body side walls overlapping the spreading rollers and covering the areas not covered thereby. The feed rollers rotate continuously parallel to the spreading rollers, and have a plurality of teeth disposed on the peripheral surfaces thereof which supply the fertilizer from the vehicle body at a peripheral speed which is lower than the peripheral speed of the spreading rollers. The gaps between the teeth on the rollers, however, become filled with fertilizer during use, thereby clogging and jamming the fertilizer mechanism. The supply rollers are pivotably mounted on the vehicles for adjusting the spreading width, but the rollers are not pivotably moved during operation of the vehicle.

Accordingly, the present invention provides a fertilizer spreading mechanism for a vehicle having a platform or body which is provided with a scraper belt for conveying fertilizer to a fertilizer discharge point at the rear of the vehicle. A pair of spreading rollers are disposed at the fertilizer discharge point and rotate about two fixed axes. The rollers extend partially over the width of the vehicle. Supply members, comprising flanges disposed on a displacement member extending at an angle to the direction of motion of the scraper belt, direct fertilizer to the spreading rollers, and are pivotably mounted on the vehicle body so as to extend over part of the remaining width of the vehicle not covered by the spreading rollers. The displacement member is continuously reciprocated about an axis located between the spreading rollers during operation of the fertilizer mechanism. The scraper belt moves stepwise the same speed as the displacement member, and is fed approximately at the reversal points of the reciprocating movement of the displacement member so that a relatively great drive force is not required.

The apparatus of the present invention provides particularly fine comminution of the fertilizer so that it reaches the roots of the plants over which it is disposed rapidly and effectively. This communition is due to the shape of the rollers, which basically comprise helical screws having a plurality of short teeth provided on the edges thereof. The feeding of the fertilizer through these teeth by the flanges on the displacement member, in cooperation with the spreading rollers, produces the fine communition of the fertilizer.

It is therefore an object of the present invention to provide a fertilizer spreading mechanism which produces a particularly fine communition of the fertilizer material.

It is also an object of the present invention to provide a fertilizer spreading mechanism which does not jam or clog during operation thereof.

It is a further object of the present invention to provide a fertilizer spreading mechanism which is simple in design, easy to manufacture, and efficient and reliable in operation.

Other objects and features of the present invention will become apparent from the following detailed description taken in connection with the accompanying drawings which disclose the embodiments of the invention. It is to be understood, however, that the drawings are designed for the purposes of illustration only, and are not intended as a definition of the limits and scope of the invention.

In the drawings, wherein similar reference numerals denote similar elements throughout the several views.

Figure 1:
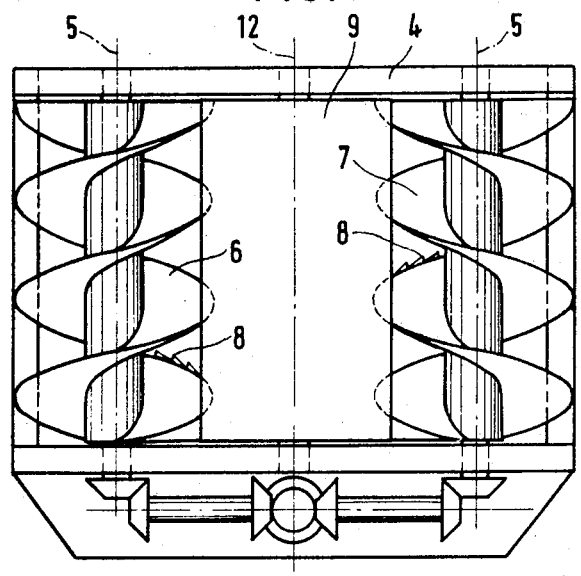
FIG. 1 is a rear view of one embodiment of a fertilizer spreading mechanism constructed in accordance with the present invention, utilizing a displacement member as the fertilizer material spreader.
Figure 2:
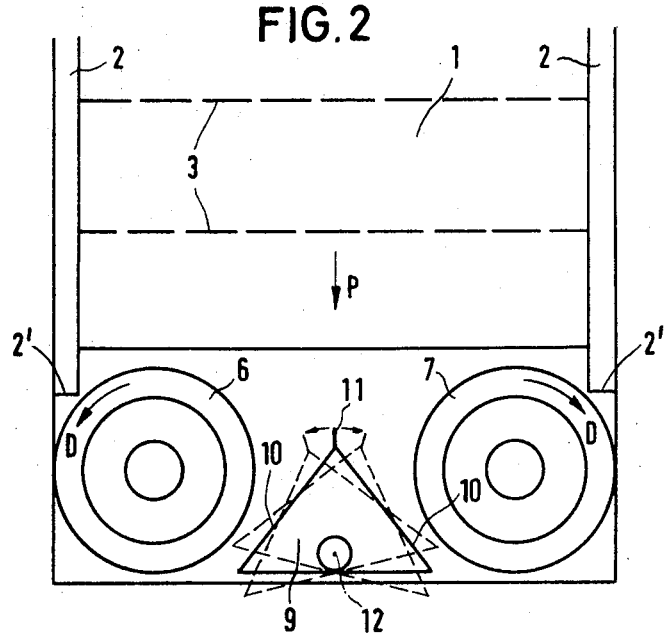
FIG. 2 is a top plan view of the fertilizer spreading mechanism shown in FIG. 1.

Referring to the drawings, specifically FIGS. 1 and 2, the rear portion 1 of the vehicle on which the fertilizer spreading mechanism is mounted, is shown. The vehicle is provided with side walls 2, and an endless scraper belt having scrapers 3. The scraper moves towards the rear of the vehicle in the direction of arrow P, opposite to the direction of movement of the vehicle, over the floor of the vehicle. The fertilizer spreading mechanism comprises a frame for having a pair of spreading rollers 6 and 7 rotatably mounted thereon. The spreading rollers rotate in opposite directions to each other, in the directions of arrows D, about fixed axes 5. The rollers are constructed as helical screws having a plurality of short teeth 8 disposed on the outer edges thereof. Only a few of these teeth are illustrated in the drawings. The ejection of fertilizer from the vehicle is guided by end faces 2" of side walls 2. Conventional devices for changing the width of spreading may be provided at this point.

In the embodiment illustrated in FIGS. 1 and 2, the diameter of each spreading roller is approximately one-third of the width of the vehicle floor or platform. The remaining third of the width of the vehicle is covered by displacement member 9. The displacement member is triangular in shape, and its longitudinal edges are disposed parallel to the spreading rollers. Sides 10 of the displacement member are disposed at an angle with respect to the direction of motion of conveyor belt 3 towards spreading rollers 6 and 7. At the top of the displacement member at the junction of the two lateral sides thereof, cutting edge 11 is disposed. The cutting edge moves in a manner similar to a pendulum about fixed pivot 12, centrally between the spreading rollers. The reciprocating drive mechanism for the displacement member is not shown in detail in the drawings, and may be of any conventional type, such as, for example, a pivot arm of an eccentric crank mounted on fixed pivot 12. The reciprocating drive for the displacement member, and the rotary drive for the two spreading rollers, are both derived from an underfloor shaft which is coupled to the power take-off shaft of a tractor. The extreme deflection points of the displacement member are indicated by the dotted lines in FIG. 2. When the displacement member reaches either of these two extreme deflection points, scraper 3 is advanced a specified distance. The fertilizer material disposed in the vehicle forms a wall of fertilizer from which the fertilizer particles are disengaged by teeth 8 during operation of the fertilizer spreading mechanism.

Figure 3:
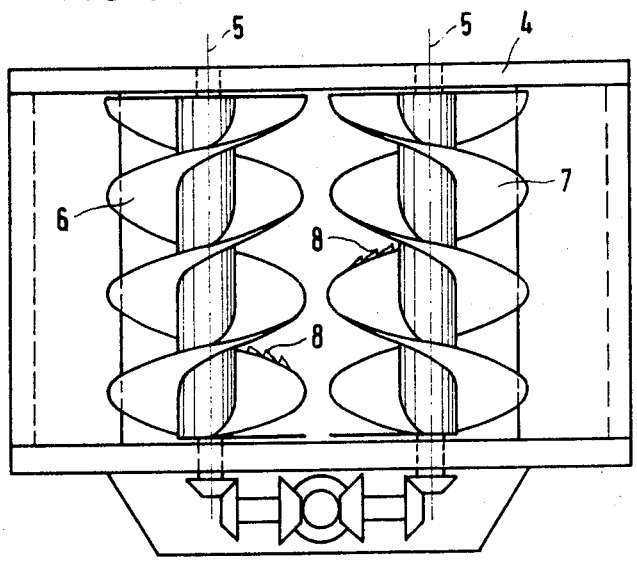
FIG. 3 is a rear view of another embodiment of a fertilizer spreading mechanism constructed in accordance with the present invention, utilizing displacement plates as the fertilizer material spreader.
Figure 4:
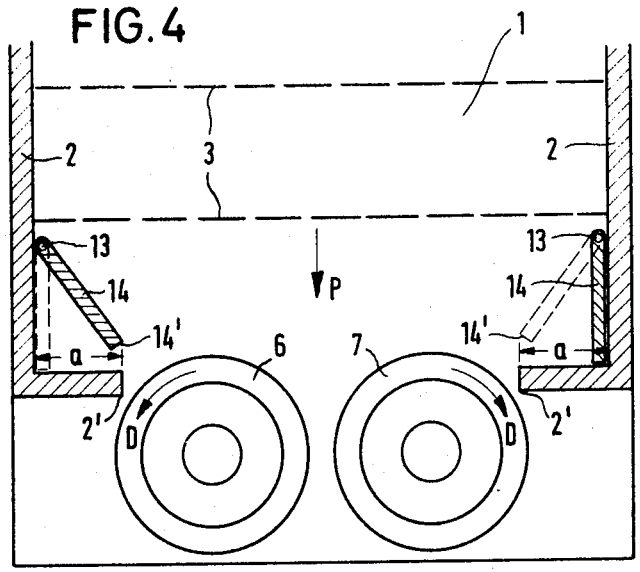
FIG. 4 is a top plan view of the fertilizer spreader mechanism shown in FIG. 3.

In FIGS. 3 and 4, another embodiment of a fertilizer spreading mechanism, similar to that shown in FIGS. 1 and 2, is disclosed. The construction of this embodiment is for the most part substantially the same as the embodiment in FIGS. 1 and 2, and similar elements will not be discussed. In FIGS. 3 and 4, displacement plates 14 having end faces 14' are mounted on the vehicle on side walls 2 so as to be pivotable simultaneously towards each other over the distance a. When plates 14 are pivoted outwardly over distance a, as soon as the plates reach their maximum outward movement, scraper belt 3 advances a specified distance. The maximum size of the advancement of the scraper belt is approximately one-tenth of the length of the displacement plates, measured from pivotal axes 13 to end faces 14'.

Fertilizer particles disengaged from the wall of fertilizer in the vehicle by teeth 8 are thrown outwardly and guided by fixed spreading edge 2', the width a of which extends from side walls 2 to about one half to one-third of the width of the vehicle platform. The diameter of each of the spreading rollers is approximately equal to one-third of the width of the vehicle platform.

As in the previously described embodiment, conventional devices for varying the spreading width of the fertilizer spreading mechanism may be provided at spreading edges 2'. They should be adjustable over two-thirds of their upper height. It should be noted that horizontal spreading edges 2' may also be vertically disposed. Since displacement plates 14 are extended longitudinally each time scraper belt 3 is advanced, fertilizing material will not accidentally drop out of the rear of the vehicle through the space through which the displacement plates move.

Displacement of the fertilizer material just in front of the spreading rollers and perpendicular to the direction of movement of the scraper belt causes the fertilizer mechanism to act upon the fertilizer material both in the direction of the movement of the scraper belt and perpendicular to the movement of the belt, especially at the loading flanges in the fertilizer discharge area of the vehicle. This arrangement also provides particularly fine comminution spreading of the fertilizer, and requires a minimum driving force from the take-off shaft of the vehicle since compression and agglomeration does not simultaneously occur from both sides in opposing directions in the fertilizing mechanism.

Figure 5:
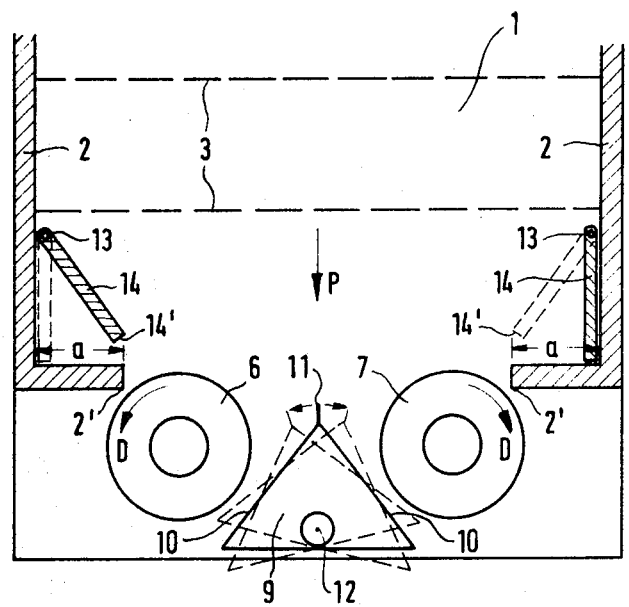
FIG. 5 is a top plan view of still another embodiment of a fertilizer spreading mechanism constructed in accordance with the present invention, utilizing both a displacement member and displacement plates as the fertilizer material spreader.

FIG. 5 illustrates another embodiment of the fertilizer mechanism in which the spreading rollers of the mechanism are spaced farther apart to provide extra platform width and to further reduce the roller diameter. The remaining width of the vehicle platform is covered by displacement member 9, which oscillates about fixed axis 12. The displacement member is approximately the same length as the spreading rollers, and is the same as the displacement member described with respect to the embodiment of FIGS. 1 and 2. The width of displacement plates 14 and the sides 10 of displacement member 9 are such that they do not overlap each other during operation of the mechanism.

While only several embodiments of the present invention have been shown and described, it will be obvious to those persons of ordinary skill in the art that many changes and modifications may be made thereunto without departing from the spirit and scope of the invention.

What is claimed is:

1. In a fertilizer spreading vehicle including a scraper belt mounted thereon for conveying fertilizer towards the rear of the vehicle for discharge, a fertilizer spreading mechanism, comprising:
   at least two power-driven, vertically disposed rotatable spreading rollers, disposed adjacent the scraper belt in the rear of the vehicle, the combined width of said spreading rollers being less than the width of the vehicle; and
   a displacement member, having at least two sides thereof disposed at an angle with respect to the direction of motion of the scraper belt, and pivotably mounted on the vehicle parallel to and between said spreading rollers, said displacement member being continuously pivotably reciprocated between said spreading rollers during operation of the fertilizer mechanism for alternately guiding fertilizer material from the scraper belt to at least one of said spreading rollers as the fertilizer material is advanced in incremental steps by the scraper belt.

2. The fertilizer spreading mechanism as recited in claim 1, further comprising fertilizer guiding members, pivotably mounted on the vehicle adjacent the sides of said spreading rollers and the scraper belt, said guide members being pivoted towards each other and said spreading rollers from a vertically disposed position to an angular position directed towards said spreading rollers, for guiding the fertilizer material towards said spreading rollers in response to the incremental advancement of the scraper belt in the vehicle.

3. The fertilizer spreading mechanism as recited in claim 2, wherein said fertilizer guide members comprise horizontally disposed stationary flanges, mounted on the vehicle and disposed adjacent the sides of said spreading rollers, and a pair of pivotable plates, pivotable between said vertically disposed and angular positions, mounted on the vehicle above said flanges adjacent the sides of said spreading rollers.

4. The fertilizer spreading mechanism as recited in claim 2, wherein said spreading rollers comprise a pair of helical screws having a plurality of teeth disposed on the edges thereof for disengaging the fertilizer material disposed in the vehicle and spreading the fertilizer to the areas outside the vehicle.

5. The fertilizer spreading mechanism as recited in claim 2, wherein said displacement member comprises an elongated triangular-shaped member having two of its sides disposed between said spreading rollers and its third side disposed parallel to the rear of the vehicle, and including a cutting edge, mounted on said member at the point of intersection of said two sides disposed between said spreading rollers.

6. In a fertilizer spreading vehicle including a scraper belt mounted thereon for conveying fertilizer towards the rear of the vehicle for discharge, a fertilizer spreading mechanism, comprising:

at least two power-driven, vertically disposed rotatable spreading rollers, disposed adjacent the scraper belt and the rear of the vehicle, the combined width of said spreading rollers being less than the width of the vehicle; and at least two fertilizer guide plates, pivotably mounted on the vehicle adjacent the sides of said spreading rollers, pivotable over the area between said spreading rollers and the vehicle, said plates being pivoted towards and away from said spreading rollers in response to incremental movement of the scraper belt, for guiding the fertilizer in the vehicle to said spreading rollers.

7. The fertilizer spreading mechanism as recited in claim 6, further comprising a pair of horizontally disposed stationary flanges, affixed to the vehicle below said guide plates, and wherein said guide plates are pivotable between a vertically disposed position and an angular position in which said plates are disposed at an angle to the direction of movement of the scraper belt, said guide plates being pivoted simultaneously inwardly towards said spreading rollers to said angular position in response to incremental movement of the scraper belt in the vehicle.

8. The fertilizer spreading mechanism as recited in claim 7, wherein the length of each of said guide plates is greater than the incremental distance through which the scraper belt is advanced.

9. The fertilizer spreading mechanism as recited in claim 8, wherein said spreading rollers comprise a pair of helical screws having a plurality of teeth disposed on the edges thereof for disengaging fertilizer material from the mass of fertilizer disposed in the vehicle and spreading the fertilizer to the areas outside the vehicle.

* * * * *